United States Patent
Altay et al.

(10) Patent No.: US 10,172,009 B1
(45) Date of Patent: Jan. 1, 2019

(54) SYSTEM AND METHOD FOR A VEHICULAR NETWORK SERVICE OVER A 5G NETWORK

(71) Applicant: NETSIA, INC., Sunnyvale, CA (US)

(72) Inventors: Can Altay, Istanbul (TR); Ali Volkan Atli, Istanbul (TR); Seyhan Civanlar, Istanbul (TR); Ali Ozer Ercan, San Jose, CA (US)

(73) Assignee: NETSIA, INC., Sunnyvale, CA (US)

( * ) Notice: Subject to any disclaimer, the term of this patent is extended or adjusted under 35 U.S.C. 154(b) by 0 days.

(21) Appl. No.: 15/945,941

(22) Filed: Apr. 5, 2018

(51) Int. Cl.
*H04W 16/04* (2009.01)
*H04W 4/40* (2018.01)
(Continued)

(52) U.S. Cl.
CPC ............ *H04W 16/04* (2013.01); *H04W 4/40* (2018.02); *H04W 12/06* (2013.01); *H04W 48/18* (2013.01);
(Continued)

(58) Field of Classification Search
CPC ....... H04W 76/10; H04W 4/70; H04W 48/18; H04W 88/02; H04W 48/16; H04W 60/00; H04W 36/0011; H04W 4/06; H04W 72/048; H04W 28/0268; H04W 60/04; H04W 76/15; H04W 88/10; H04W 16/02; H04W 24/02; H04W 28/0247; H04W 36/0022; H04W 28/18; H04W 72/0406; H04W 74/0833; H04W 88/06;
(Continued)

(56) References Cited

U.S. PATENT DOCUMENTS

| 2017/0289791 A1* | 10/2017 | Yoo ........................ H04W 76/11 |
| 2017/0332421 A1* | 11/2017 | Sternberg .............. H04W 76/11 |
| 2017/0359768 A1* | 12/2017 | Byun ...................... H04W 8/06 |

OTHER PUBLICATIONS

"System Architecture for the 5G System; Stage 2," 3GPP TS 23.501, V2.0.1, Release 15, Dec. 2017; 183pgs.
(Continued)

*Primary Examiner* — Daniel Lai
(74) *Attorney, Agent, or Firm* — IP Authority, LLC; Ramraj Soundararajan (57) ABSTRACT

In Vehicle-to-Infrastructure (V2I) communications, the broadcast data towards the vehicles must use the network resources efficiently while the unicast data must arrive reliably with ultra-low-latency. Furthermore, the connections must remain network-attached while vehicles move rapidly. A system/method are described through which a vehicle with a special communications module and internal computer can connect to one or more 5G vehicular network slices (VNS) with multiple Radio Access Technologies (multi-RAT) in order to efficiently communicate with local or remote transportation information databases and applications, road safety and emergency infrastructures. The infrastructure of this disclosure uses the network-slicing feature of a 5G mobile network to carve out a vehicular data and control planes specialized to offer the vehicular service only. The vehicular network slice further comprises (i) Road Side Access Unit (RSAU), (ii) Vehicle Id registrar (VIR), (iii) Vehicular Slice Manager (VSM), and (iv) distributed Virtual Transportation Network Functions (VTNF).

19 Claims, 5 Drawing Sheets

(51) Int. Cl.
*H04W 60/00* (2009.01)
*H04W 12/06* (2009.01)
*H04W 48/18* (2009.01)
*H04W 88/10* (2009.01)
*H04W 88/06* (2009.01)
*H04W 88/08* (2009.01)

(52) U.S. Cl.
CPC ............ *H04W 60/00* (2013.01); *H04W 88/06* (2013.01); *H04W 88/085* (2013.01); *H04W 88/10* (2013.01)

(58) Field of Classification Search
CPC ..... H04W 16/04; H04W 16/14; H04W 40/34; H04W 48/06; H04W 76/12; H04W 76/14; H04W 8/08; H04W 8/22; H04W 16/10; H04W 28/26; H04W 48/14; H04W 72/0413; H04W 4/40; H04W 12/06; H04W 88/085
See application file for complete search history.

(56) References Cited

OTHER PUBLICATIONS

Xiaohu Ge et al., "5G Software Defined Vehicular Networks," IEEE Communications Magazine, Feb. 13, 2017, 16pgs.
Kai Liu et al., "Cooperative Data Scheduling in Hybrid Vehicular Ad Hoc Networks: VANET as a Software Defined Network," IEEE/ACM Transactions on Networking, Jun. 2016, 15pgs.

\* cited by examiner

SYSTEM AND METHOD FOR A VEHICULAR NETWORK SERVICE OVER A 5G NETWORK

BACKGROUND OF THE INVENTION

Field of Invention

The present invention generally relates to radio technologies and particularly 5G for providing an efficient networking infrastructure specifically designed to support intelligent transportation and connected vehicles using network slicing.

Discussion of Related Art

Automotive industry is working towards making the dream of connected vehicles a reality. A highly intelligent transportation will be viable with the availability of functions and speeds provided by 5G mobile networks. So called 'connected vehicles' are projected to be communicating with each other (Vehicle to Vehicle—V2V) and with one or more transportation information centers also known as 'Infrastructure' (Vehicle to Infrastructure—V2I) within the next decade. These centers can rapidly estimate traffic densities, guide vehicles towards different routes under congestion, provide vehicle software updates, change schedules of public transportation vehicles, and receive immediate reports on accidents (even when the driver is in no condition to call). Reciprocally, cars will be sending out important analytics, GPS, camera and sensor data, surrounding traffic information, etc. or receive data from other vehicles and the public Internet. Furthermore, driverless vehicles will be emerging soon that leverage the network's transportation information infrastructure as well as their own intelligent road monitoring and assessment capabilities.

Vehicle to vehicle (V2V) communications using ad-hoc wireless networks such as VANET [see Kai Liu et.al, "Cooperative Data Scheduling in Hybrid Vehicular Ad Hoc Networks, VANET as a Software Defined Network, IEEE Transactions on Networking, June 2016] have been widely explored in prior art especially in the academic world. Furthermore, autonomous (driverless) driving using cameras mounted on the cars, image processing and deep learning techniques (based on neural networks) to estimate steering angles and car speeds has also been a popular topic of research. However, the Vehicle to Infrastructure (V2I) communications [see Xiaohu Ge et.al, "5G Software Defined Vehicular Networks", IEEE Comm. Magazine, February 2017] had not been as widely explored until recently due to lack of a wireless communications infrastructure to support such volumes of rapidly moving targets and large amounts of information exchange between moving targets and the network. Vehicles must obviously act as special radio access end points that wirelessly access the capabilities made available by a transportation information infrastructure distributed on the public Internet. With the advent of GPS, accurate position of vehicles and therefore analysis of the entire road traffic is even possible now. Furthermore, cameras and sensors installed on vehicles can provide useful information about the surrounding vehicles.

Vehicles have somewhat different network usage characteristics than the users of other mobile devices such as smart phones:

(i) Vehicles move rapidly.
(ii) They periodically transfer (send and receive) data. In the special case of driverless, some level data interactivity may be necessary.
(iii) The transportation information they seek is not rapidly changing. At a macroscopic level, network traffic flows' speed and density are usually predictable.
(iv) Vehicles seek both unicast and broadcast type of information. The unicast information is specific to a vehicle. The broadcast type of information is specific to traffic.
(v) Some or most of the transportation information (such as new routes, commands, or accident reports) must be delivered with ultra low delay and high reliability.
(vi) Much of the traffic information is localized.

Network slicing is the cornerstone of the 5G networks. Using software defined networking (SDN) concepts, a 5G infrastructure can intelligently slice into the virtual control and data plane network functions (including RAN) [see 3GPP TR23.501]. Each individual slice can function in isolation from the rest of the network just like a virtual network with dedicated resources. Doing so, it can meet requirements of different traffic types and services. Each individual network function within a slice is envisioned as a virtual network function (VNF) that can be widely distributed within the network, and instantiated when and where needed, and capacitated on demand. Grouping of these network functions that form a slice obeys different policies and offers specific quality of service. Any user equipment (UE) can signal the network during the attachment procedure with the desired network slice using a special field in the registration request message.

Using these concepts, one or more vehicular network slices (VNS) are envisioned to offer the vehicular service. Multiple VNSs may be required as different traffic patterns have different requirements. Given aforementioned characteristics of the vehicular data traffic here are two embodiments for the implementation of the VNS:

In one embodiment, it is envisioned that the vehicular network slice is comprised of (i) the 'edge' network functions geographically located at the roadsides and dedicated to vehicle communications only, and (ii) the 'inner' network functions geographically farther away from roadsides are an overlay on the 5G core network.

In another embodiment, the network functions of the vehicular service are not dedicated, but an overlay of the 5G core network, in which case the network functions of the core must be widely distributed including those 'edges' that are close to the roadsides. Therefore, certain core network functions residing at the edges can be sliced up to offer the vehicular service. The slicing concept basically eliminates the need for the vehicular network functions to be dedicated to the vehicular service only.

Aforementioned dedicated edge component must be inexpensive—as they will be deployed in large numbers, multi-functional and highly efficient to take away most of the data traffic burden from the core network and the Internet.

The vehicular transportation information infrastructure may comprise one or more mobile operator's 5G networks each operator offering the VNSs with the same definitions, but administered by the municipality. In another embodiment, it may be a billable subscription service of a single operator. When multiple operators provide the vehicular service, each vehicle must be able to connect multiple operators' networks.

NOMENCLATURE

AP Access Point
AMF Access and Mobility Management Function
CN Core Network

CP Control Plane
DL Downlink
eMBBF Enhanced Mobile Broadband Function
gNB 5g-NodeB
GPS Global Positioning System
NAI Network Access Identifier
NF Network Function
NSSF Network Slice Selection Function
NSSAI Network Slice Selection Assistance Information
PCF Policy Control Function
PEI Permanent Equipment Id
QoS Quality of Service
(R)AN (Radio) Access Network
RSAU Road Side Access Unit
SBA Service Based Architecture
SDN Software Defined Network
SMF Session Management Function
S-NSSAI Single Network Slice Selection Assistance Information
SSC Service and Session Continuity
SST Slice/Service Type
SUPI Subscription Permanent Identifier
UL Uplink
UL CL Uplink Classifier
UPF User Plane Function
UDR Unified Data Repository
V2V Vehicle to Vehicle
V2I Vehicle to Infrastructure
VID Vehicle ID
VIR Vehicle Identification Registry
VIM Vehicle Identification Module
VNF Virtual Network Function
VTNF Virtual Transportation Network Function
VS Vehicular Slice
VSM Vehicle Slice Manager Embodiments of the present invention are an improvement over prior art systems and methods.

SUMMARY OF THE INVENTION

In one embodiment, the present invention provides a method implemented in a mobile network communications infrastructure enabling communications for a vehicle furnished with radio network access capabilities and able to connect to multiple operators, the mobile network communications infrastructure comprised of at least a first and second operators, the first operator having a first default slice associated with its core network and the second operator having a second default slice associated with its core network, the first and second operators also having a third and fourth slice, respectively, wherein each of the third and fourth slice: (i) has identical properties between the first and second operators and (ii) comprising partitioned network capabilities that are specific to offering a vehicular service, and (iii) comprising either physically separate network functions from the first and second default slices, or network functions whose resources are shared with same or different functions of said first and second default slices; the method comprising: (a) the vehicle sending a registration request message and attaching, based on the registration request message, to a first access and mobility function (AMF) associated with the first default slice of the first operator, wherein the registration request message comprises an indicator denoting a desire to attach to the fourth slice; (b) the first AMF verifying identity of the vehicle from the registration request message; (c) upon successful verification in (b), the first AMF redirecting the registration request message to a second AMF of second default slice associated with the second operator; (d) the second AMF querying the identity of the vehicle in a vehicle ID registrar database and authorizing the vehicle; and (e) the second AMF then querying a policy control function to obtain vehicle policy indications and instructing the vehicle to use network functions of the fourth slice in accordance with the vehicle policy indications.

In another embodiment, the present invention provides an article of manufacture comprising non-transitory computer storage medium storing computer readable program code which, when executed by a processor implements a method implemented in a mobile network communications infrastructure enabling communications for a vehicle furnished with radio network access capabilities and able to connect to multiple operators, the mobile network communications infrastructure comprised of at least a first and second operators, the first operator having a first default slice associated with its core network and the second operator having a second default slice associated with its core network, the first and second operators also having a third and fourth slice, respectively, wherein each of the third and fourth slice: (i) has identical properties between the first and second operators and (ii) comprising partitioned network capabilities that are specific to offering a vehicular service, and (iii) comprising either physically separate network functions from the first and second default slices, or network functions whose resources are shared with same or different functions of said first and second default slices; the computer storage medium comprising: (a) computer readable program code in the vehicle sending a registration request message and attaching, based on the registration request message, to a first access and mobility function (AMF) associated with the first default slice of the first operator, wherein the registration request message comprises an indicator denoting a desire to attach to the fourth slice; (b) computer readable program code in the first AMF verifying identity of the vehicle from the registration request message; (c) upon successful verification in (b), computer readable program code in the first AMF redirecting the registration request message to a second AMF associated with the second slice of the second operator; (d) computer readable program code in the second AMF querying the identity of the vehicle in a vehicle ID registrar database and authorizing the vehicle; and (e) computer readable program code in the second AMF then querying a policy control function to obtain vehicle policy indications and instructing the vehicle to use network functions of the fourth slice in accordance with the vehicle policy indications.

In yet another embodiment, the present invention provides a method implemented in a mobile network communications infrastructure enabling communications for a vehicle furnished with radio access capabilities and able to connect to multiple operators, the mobile network communications infrastructure of each operator among the multiple operators being comprised of a first default slice associated with its core network and a set of slices, wherein: (i) each slice in the set of slices using a different set of virtual data plane network functions and thereby each with different partitioned network capabilities that are specific to offering an aspect of a vehicular service, (ii) the set of slices being either comprised of a physically separate network functions from the first slice, or network functions whose resources are shared with same or different functions of the first slice, the method comprising: (a) the vehicle sending a registration request message and attaching, based on the registration request message, to a first access and mobility function (AMF) associated with the first default slice, wherein the registration request message comprises an indicator denoting a desire to use services of one or more slices within the set of slices; (b) the first AMF communicating with a network slice selection function (NSSF), and identifying a second AMF associated with a second slice within the set of slices that is closest to the vehicle to trigger a redirection action of the registration request message for each specific service type in the indicator; (c) the first AMF redirecting the registration request message to the second AMF; (d) the second AMF querying the identity of the vehicle in a vehicle ID registrar database and authorizing the vehicle in the second slice identified in (b); and (e) the second AMF then querying a policy control function to obtain vehicle policy indications and instructing the vehicle to use network functions of the second slice identified in (b) in accordance with the vehicle policy indications.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

An electronic device (e.g., base station, agent or controller) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware. As used herein, a network device is a piece of networking equipment, including hardware and software that communicatively interconnects other equipment on the network (e.g., other network devices, end systems). A network device is generally identified by its media access (MAC) address, Internet protocol (IP) address/subnet, network sockets/ports, and/or upper OSI layer identifiers.

A Radio Access Network (RAN) is generally comprised of one or more base stations. A base station provides cellular connection of user equipment (UE) to a mobile operator's core network. The base station is connected to an antenna (or multiple antennas) that receives and transmits the signals in the cellular network to cellular phones and other cellular devices. The RAN is connected to mobile operator's Core Network (CN) to transmit data end to end.

A network function is generally a software capability implemented on a computer. One or more network functions can be hosted on the same computer. A network function can be remotely or locally instantiated, terminated or capacitated.

Figure 1:
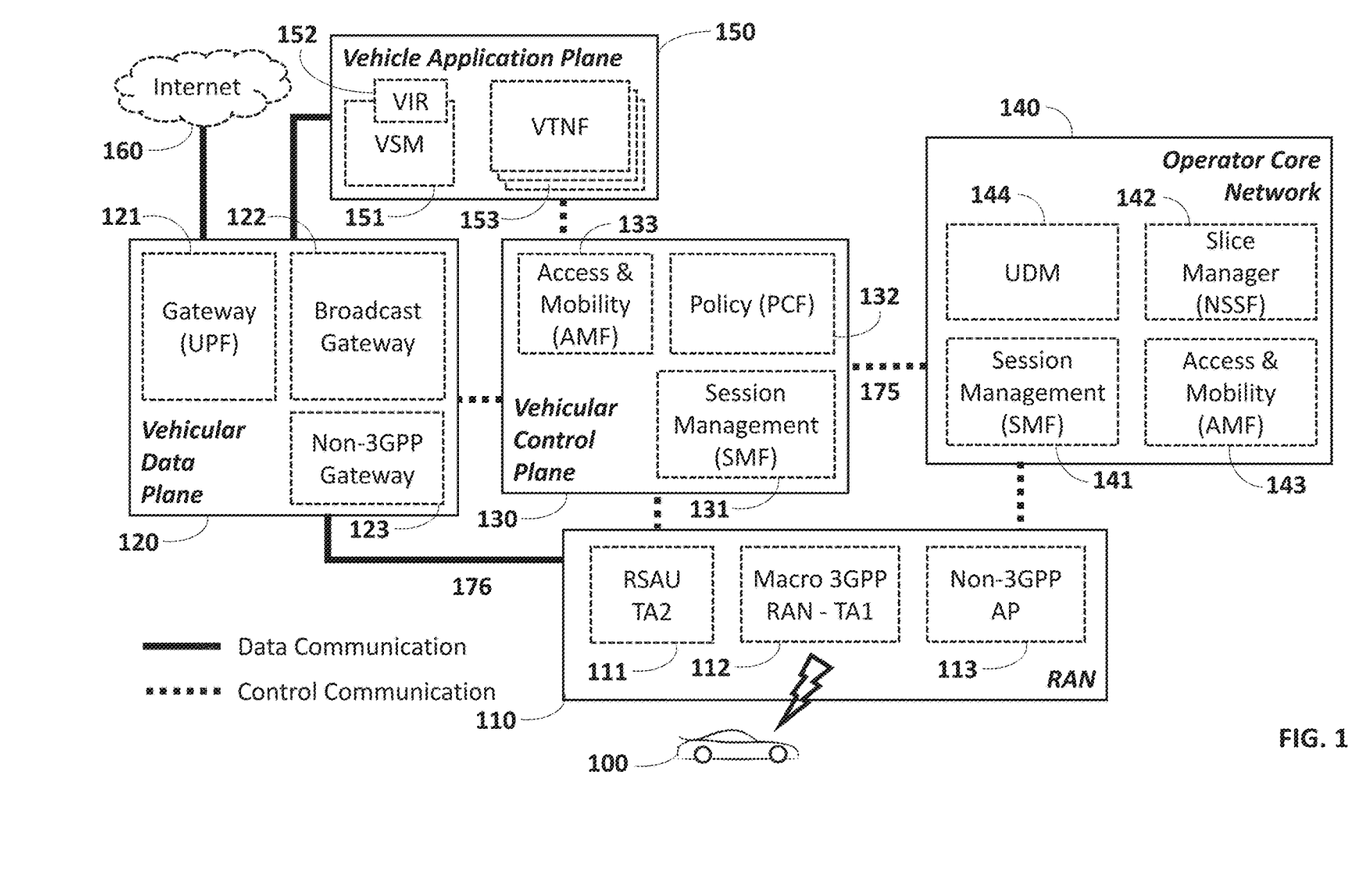
FIG. 1 illustrates a high-level block diagram of the mobile network with the vehicular service according to this invention.

FIG. 1 illustrates a block diagram of a possible realization of the vehicular network service using core network functions to of the vehicular network slice. These core network functions are included into the architecture to provide a more sophisticated management of RAN, the authentication with VIR 152, different ways of charging and billing, and connectivity with various operator base stations. As illustrated, when vehicle 100 attempts to receive the vehicular service it has to first connect to RAN 110, which includes RSAU 111, and optionally macro 3GPP operator base stations 112, Non-3GPP access points 113 and even a macro 5G base station (not shown) for various possible wireless connection options. RSAU 111 may contain a resident VTNF, but alternative radio access units 112 and 113 do not necessarily contain any resident VTNFs.

FIG. 1 illustrates both default (home) operator core network elements 140, and those network elements of the vehicular slice in vehicular control plane 130 and vehicular data plane 120. Note that only the subset of the core network functions that are used to route control traffic towards the vehicular control plane 130 are illustrated in 140. There are many other core network functions of the core network that are used to serve other types of users but not illustrated in 140 since they do not pertain to redirecting traffic to the vehicular network slice. For all SIM card based authentication purposes with SUPI or IMSI identities, operator's unified data management (UDM) 144 is used. Operator access and mobility management function (AMF) 143 and session management function (SMF) 141 entities serve all operator users, while they also assist routing and redirection of the vehicular service operations.

Network slice selection function (NSSF) 142 is an important function provided by 5G to indicate a slice (service type) specific configuration to AMF 143 during the UE registration request using a newly defined field called Slice Type (SST) within the Network Slice Selection Assistance Information field (NSSAI) of the message. Using different values for SST, the vehicle can specify the desire to attach to different types of network slices. There are standard or service specific SST values. For example, broadcast data, ultra reliable and low delay and massive IOT are a few examples of standard slices. Furthermore, the UE can specify the desire to attach to multiple virtual network slices in one registration request towards AMF 143.

The connection module of the vehicle first attempts to attach to network via contacting operator's AMF 143. Then, AMF 143 checks the SST field(s) of NSSAI and with NSSF 142's redirection recommendation, and it sends the attach request to AMF 133 of the vehicular control plane 130. AMF 133 is most likely chosen as the AMF of the slice closest to the vehicle, if more than one such AMF is deployed. The location of the vehicle can easily be determined, for example, from the location of the base station forwarding the request.

Vehicular control plane 130 may include its own dedicated AMF 133 to provide flexible and quick service to vehicles in one embodiment. AMF 133 performs user attach procedure by authentication of UDM 144, retrieve applicable vehicle access policy from policy control function (PCF) 132 of the slice, and performs vehicle subscription control against VIR 152. The device based access control with VIR 152 can be handled with 5G-Equipment Identity Register (5G-EIR) network function as specified in 5G. Session management function (SMF) 131 handles data sessions only for the vehicular traffic using the gateways provisioned in vehicular data plane 120. Routing of traffic towards data plane functions is known in prior art.

Vehicular data plane 120 is capable of routing data traffic between vehicles and the virtual transportation network function (VTNF) 153 and across VNTFs that are present in vehicular application plane (VAP) 150 or public Internet 160 depending on chosen slice type using Gateway 121 (known as UPF in 5G). Regional broadcast data is routed towards the vehicles via Broadcast Gateway 122 (known as MBMS for LTE and eMBBF for 5G). Moreover, operator assisted non-3GPP access points 113 can extend the coverage of the vehicular service by using non-3GPP Gateway 123 (known as N3IWF for 5G).

Vehicular application plane 150 consists of Vehicular Slice Manager (VSM) 151, VIR 152, and VTNF 153 (multiple VTNFs). VSM 151 is the brain of all vehicular slices assisting AMF 133 and PCF 132 with access profiles (e.g., what they can request and receive) of the vehicles depending on their service type. During the attach procedure, it is the responsibility of the vehicular user to indicate the desired service type/slice by revealing the slice type using the SST field. Each vehicular user can be simultaneously attached to multiple vehicular slices, each slice providing a different QoS. Depending on the slice type (i) PCF 132 provides different access control policies, and (ii) AMF 133 assigns different frequency priorities/cell reselection parameters to the vehicle by sending this information to RSAU 111. VIR 152 authenticates the vehicle using the device IMEI/PEI related access and service variations.

There may be one or more VDP 120 depending on the specific vehicular slice implementations. Operator's AMF 143 can easily point to different AMF 133s for different slice types indicated in the SST field, if desired. The VTNFs that are collocated with RSAUs to minimize delay and maximize reliability can also be provided within the operator's shared core network. If an RSAU can't reach its local VTNF, one of the remote VTNFs can provide the service.

Figure 2:
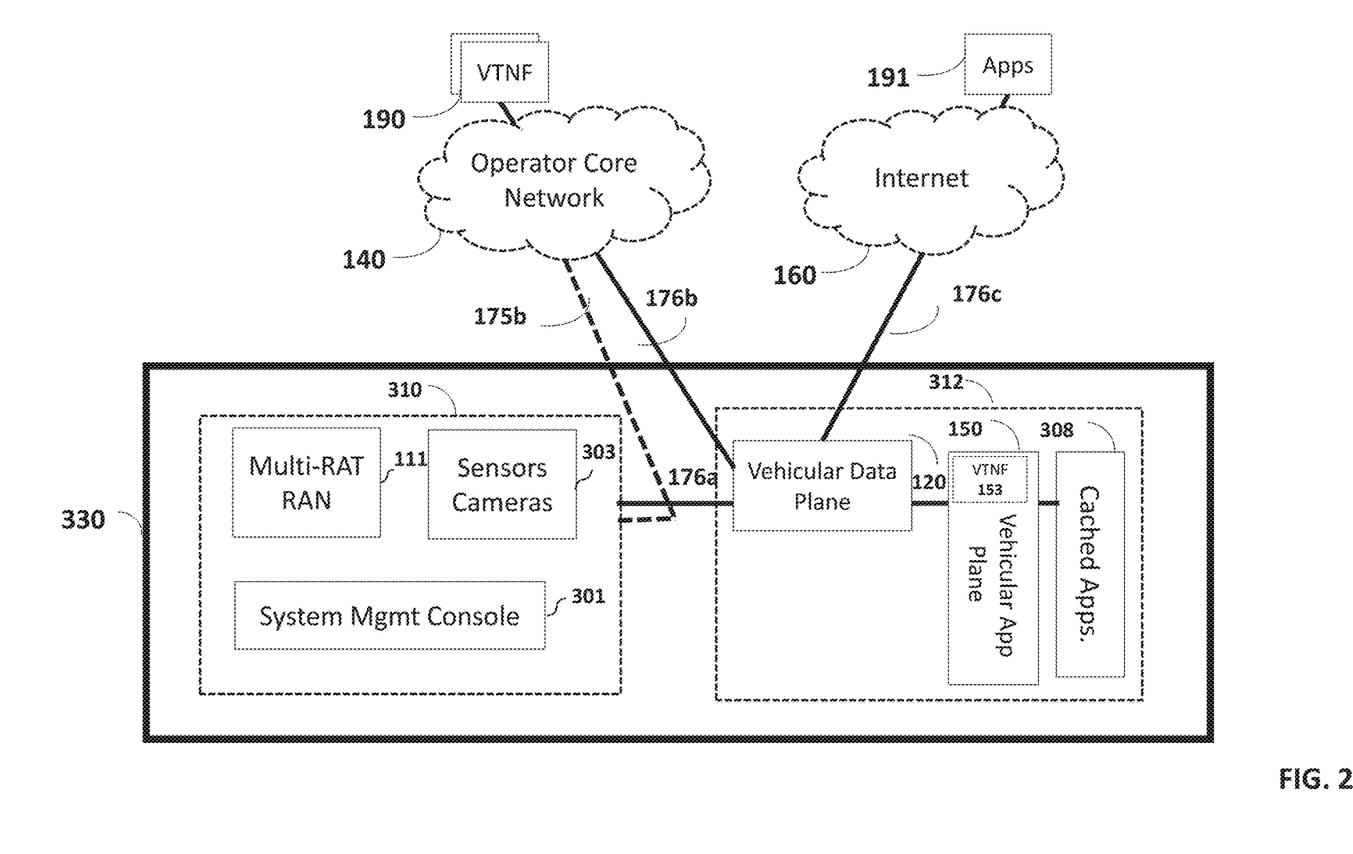
FIG. 2 shows a block diagram of RSAU according to this invention.

There are various implementations of RSAU 111, VDP 120, VCP 130 and VAP 150. A simple 'All-In-One' embodiment of RSAU 330 is depicted in FIG. 2. RSAU 330 encompasses the radio access capabilities as well as all the dedicated vehicle data plane, and application plane functions. It is comprised of (i) multi-RAT access 111, sensors and cameras 303, a System Management Console 301 in subcomponent 310, and (ii) VDP 120, VCP 130 and VAP 150, and locally Cached Applications 308 in subcomponent 312. Data connection 176b extends to Operator Core Network 140 and to remote VTNFs 190. Data connection 176c extends to public Internet 160 and the applications 191 on the Internet. Control connection 175a handles control traffic.

Figure 3A:
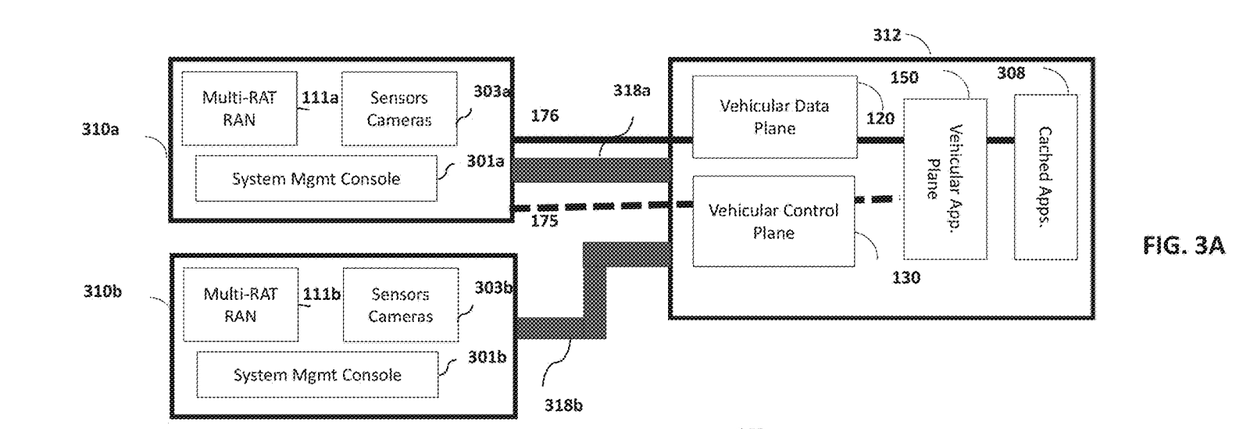
FIGS. 3A and 3B illustrate two additional physical embodiments of RSAU.
Figure 3B:
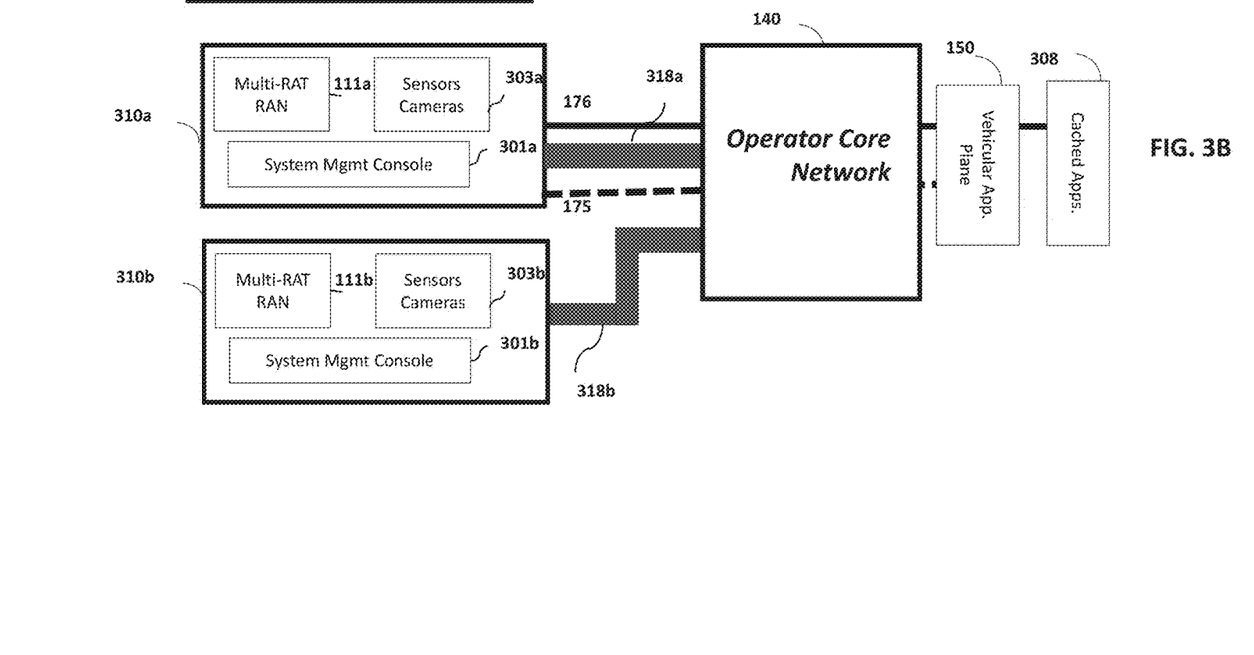

FIGS. 3A and 3B contrast two other useful implementations against 'All-In-One' RSAU. In FIG. 3A RSAU 310b is only comprised of multi-RAT access 111, sensors and cameras 303, a System Management Console 301, which are in fact subcomponent 310 of FIG. 2. However, subcomponent 312 is deployed in another computer, serving both RSAU 310a and 310b. In FIG. 3B Subcomponent 312 except VAP, is deployed as an overlay to core network 140. For example, AMF 133 runs on AMF 143, SMF 131 runs on SMF 141, PCF 132 runs on the PCF function of operator's core network, and so on. A dedicated Vehicle Application Plane 150 with VIR, VSM and VTNF is distributed across the network closer to edges or can be maintained within an application function and network function repository of operator 5G core network 140. This architecture does not require any dedicated resources for the virtual network functions of the of the core network.

Since RSAUs are special access units designated for vehicles, regular mobile users access the mobile network is by attaching to nearest gNB or eNB. When it is more economical, the gNBs may also allow direct connection of vehicles without requiring an RSAU as illustrated in FIG. 1.

Figure 4:
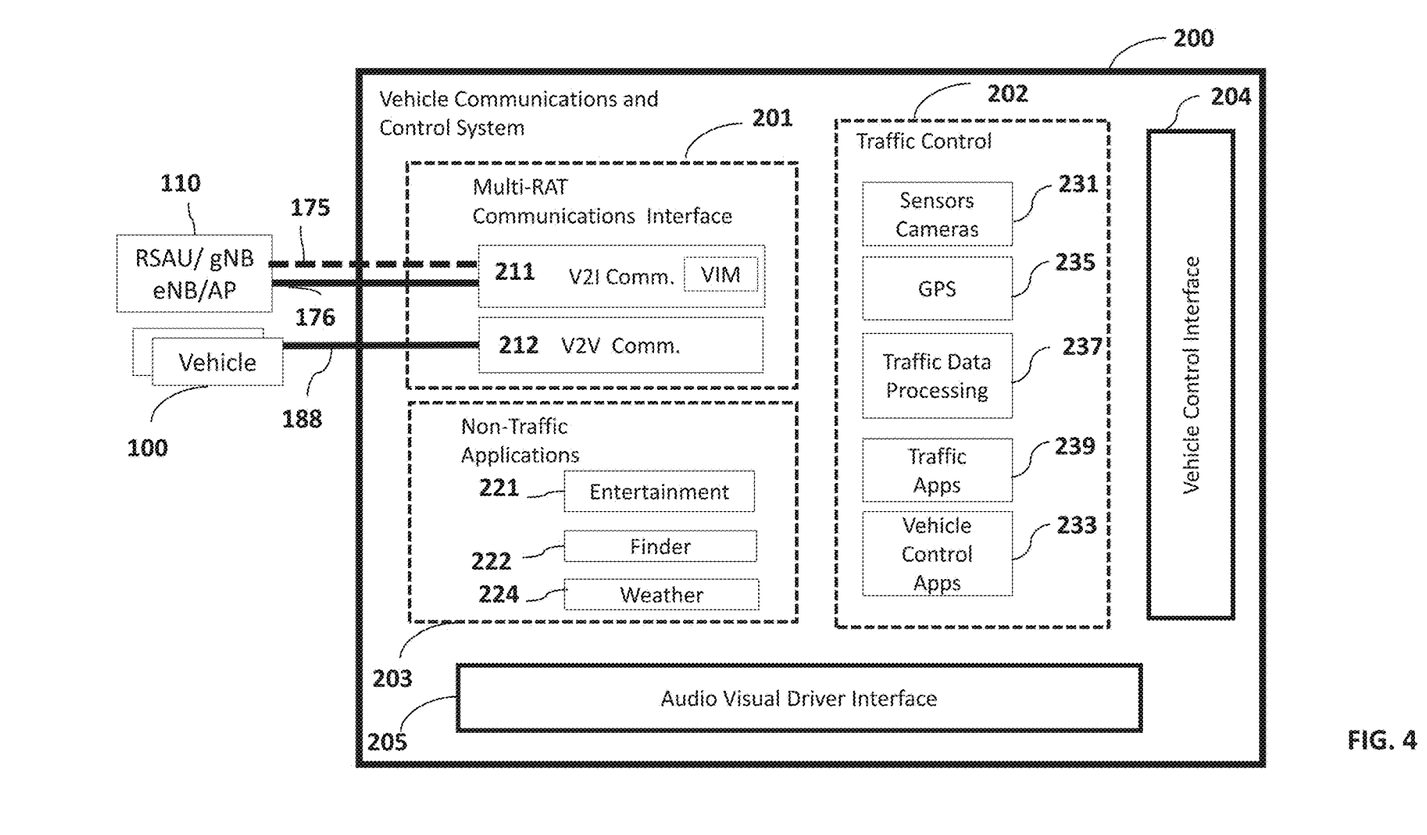
FIG. 4 illustrates a high-level block diagram of the In-Vehicle Communications and Processing Module (IVCU) according to this invention.

A complete infrastructure for a vehicular service starts at the vehicle, which must simply have In-Vehicle Communication and Processing Unit 200 with multi-RAT communications interface module 201 and a computer as illustrated in FIG. 4. Although not all the components of the system are illustrated, some of the key elements are included for better understanding of the rest of the invention. Subcomponent 201 provides both V2V and V2I radio connectivity via modules 212 and 211, respectively. These radio connections may use different technologies. For V2I communications, each vehicle must identify itself with the network and register using a permanent vehicle ID(s) contained in its Vehicle Identification Module (VIM). In one embodiment, the VIM's location may be completely obfuscated within the vehicle so that one can't remove it. For example, the car's computer may stop working if VIM is removed. In another embodiment, VIM information may be completely embedded into the computer. VIM allows lost, stolen (or even government vehicles) being easily trace-routed.

The vehicle may further contain Traffic Control Unit 202, which includes various componentry for relative or absolute position reporting such as sensors and cameras 231 and GPS 235. Traffic data processing unit 237 processes information coming from other vehicles and the Infrastructure. Traffic Applications 239 are the suite of applications that rely on the real-time traffic information to determine various requests such as alternate routes, traffic info on other routes, etc. Vehicle control application 233 provides the control feedback for the mechanical steering and braking systems according to processed traffic data. The vehicle system may optionally contain non-traffic applications 203 such as audio/video entertainment 221, a finder (gas station, post office, restaurant, etc.) 222, and weather 224. Although V2V and V2I communications interfaces are separately shown, in another embodiment they can be the same interface. It may further contain audiovisual driver interface 205 and vehicle control interface 204 towards car's braking and steering systems.

The Vehicle Identification Module (VIM) may have a MAC address as well as another Subscriber Permanent ID (SUPI) for mobile communications. For 5G core, VIM can be implemented as 5G-EIR or/and unified data repository (UDR), or as a separate network function. In one embodiment, the SUPI can be a special type of address designated to vehicles only. A vehicle's SUPI is assigned to each vehicle's VIM card at the time of vehicle registration. In an embodiment, the assignment of the vehicle SUPI is independent of the local mobile operator. The municipality (or appropriate road traffic organization) can perform the assignment at the time of providing a license plate for the car.

An identification of each connected vehicle called 'vehicle ID (VID)' is a special data record. The VID goes into an electronic database called the Vehicle ID Registrar (VIR). An exemplary VID is as follows:
{vehicle IMEI/PEI;
vehicle permanent identification number;
vehicle license plate;
vehicle make and model;
vehicle pilotless or regular;
vehicle owner's name;
vehicle owner's registered telephone number;
other optional fields}

The VIR is a repository that is accessible by all mobile operators to verify and authenticate a vehicle. There may be a national VIR that is interconnected to VIRs in other countries. When a vehicle attempts to attach to an RSAU in a 5G network, a control plane function can send the vehicle a special identity request in response to which the vehicle sends it's VID (or parts of it). If the VID is a valid record within the VIR, the user is authenticated. This function is specific to the vehicular slice. A VID must always be accessible by all operators. VIR can be a database managed by the municipals as new cars are added to the roads, change license plate etc., and can possibly be globally synchronized with other similar databases worldwide.

Figure 5:
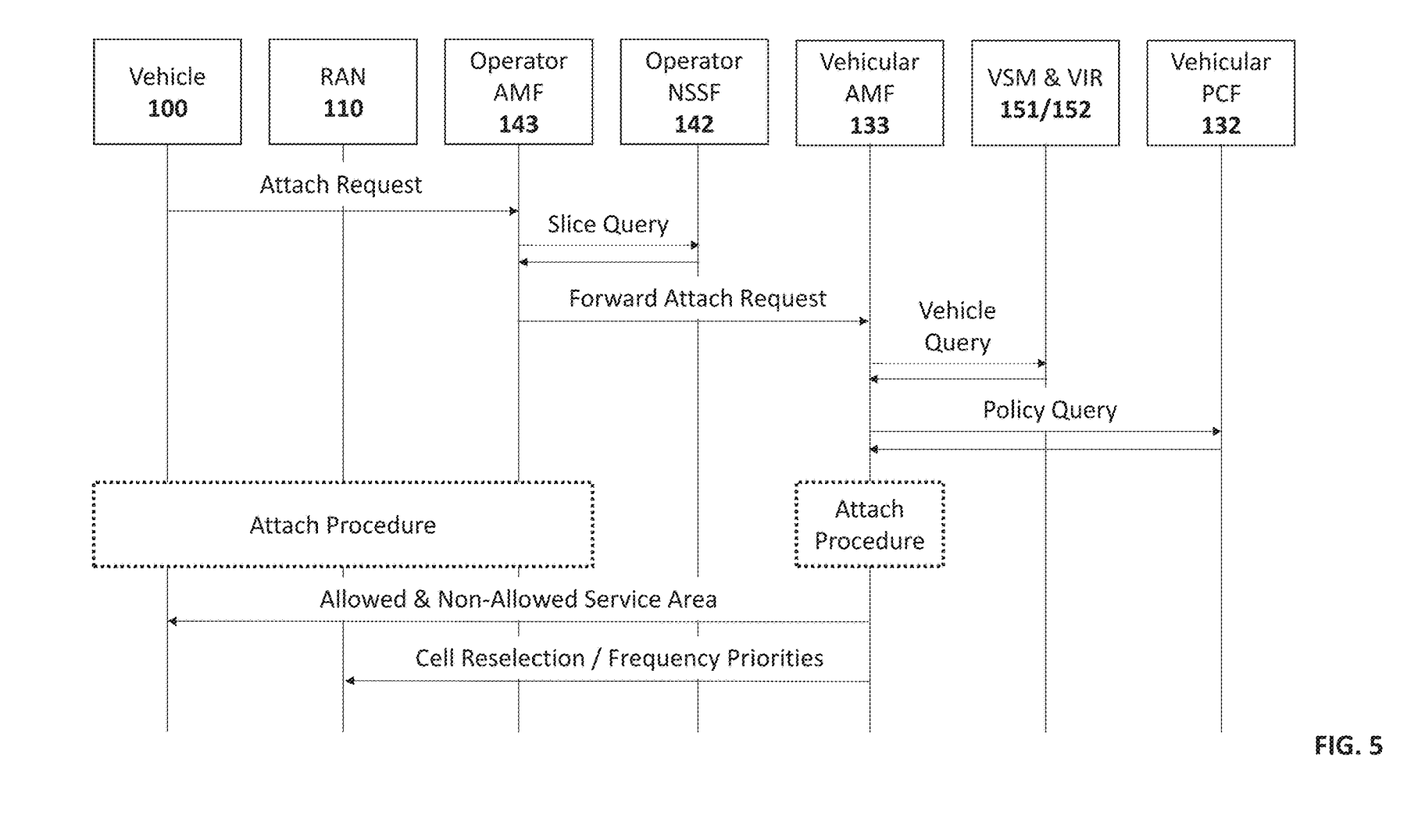
FIG. 5 illustrates an exemplary sequence of messaging.

FIG. 5 illustrates a typical attach procedure through vehicular data and control planes 120 and 130, respectively. When the communication module of vehicle 100 attempts to connect to any of the RAN units in box 110 of FIG. 1, its registration request is most likely going to be sent to the closest operator AMF 143. The request includes slice choice(s) of the vehicle user. These slice choices may include one or more than one of following service types:

(1) V2V and V2I delay sensitive traffic: This kind of traffic may be originated or managed by the distributed VTNFs. Self-driving vehicles and emergency conditions call for this type of QoS.

(2) Regional broadcast traffic information: Depending on connected base-station, vehicular service network can provide traffic information through broadcast channel to all vehicles in a region.

(3) Passive GPS location gathering: As a vehicular IoT service, the position of each vehicle may be gathered periodically for security reasons.

(4) Internet connection: the vehicular communication module simply behaves like a cellular internet gateway to provide connectivity to the vehicle applications and the passengers in the vehicle.

Each service type is represented by vehicle communication module as an S-NSSAI in registration request. When AMF 143 receives the attach request, it queries NSSF 142 for the slice specific information. Slice query includes all slices of NSSAI that are requested by the vehicular user. NSSF 142 keeps the slice specific AMF, SMF, UPF, local area data network (LADN) identification. Hence, NSSF responds to the query of vehicular slices with the identity of serving vehicular AMF 133, then attach request is forwarded from AMF 143 to vehicular AMF 133. In the case of vehicle being able to connect to multiple operators, AMF 143 may belong to one operator while AMF 133 belongs to another. This scenario may be realistic in case multiple operators support the vehicle service. Each slice of the vehicular service implemented by multiple operators has to have the same (or similar) slice attributes. But, typically AMF 143 and 133 will belong to the same operator. As vehicular AMF 133 receives the request, it performs attach procedures through vehicular PCF 132, and operator's UDM 144. Additionally, it queries VIR 151 database with permanent addresses of the communication module (IMEI/PEI number) of the vehicle for further admission and service control. This additional authentication may allow device type related service variations.

Vehicular AMF 133 performs a policy query to PCF 132. Doing so, AMF 133 obtains service tracking area information, which can be used for access control between different tiers of base stations. Namely, depending on the slice type, the vehicle can be forced to attach only to macro base stations or only to RSAU's by sending back the corresponding tracking area (TA) code(s) to the user during the attach procedure. The user can receive sets of both allowed and non-allowed service (tracking) areas.

Looking at FIG. 5, if the vehicle only requests the regional broadcast traffic information slice, it can be forced to connect only to tracking area 1 (TA1) via macro base stations 112 of FIG. 1 for less cell reselection/handover. However, if the vehicle requests the slice of delay sensitive traffic, it is more beneficial to connect to tracking area 2 (TA2) via RSAU 111 to reach the localized VTNFs and locally routed V2V traffic.

Finally, AMF 133 can also provide user specific cell reselection and frequency priorities to RAN base stations. By using these extra parameters, the mobility of the user can be further enhanced for each slice type. For example, by using PCF 132, the vehicular user may request to initiate mobile initiated connection only (MICO) mode. This mode allows the user to send and receive data only when it attempts to connect, so that the user does not need to stay connected. If the user only intends to send its GPS data without expecting any downlink traffic, the MICO mode prevents the communication module to unnecessarily both listening paging messages and tracking cell reselection.

Many of the above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer.

These terms exclude any wireless signals, wired download signals, and any other ephemeral signals.

CONCLUSION

A system and method has been shown in the above embodiments for the effective implementation of a system and method for a vehicular network service over a 5G network. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A method implemented in a mobile network communications infrastructure enabling communications for a vehicle furnished with radio network access capabilities and able to connect to multiple operators, the mobile network communications infrastructure comprised of at least a first and second operators, the first operator having a first default slice associated with its core network and the second operator having a second default slice associated with its core network, the first and second operators also having a third and fourth slice, respectively, wherein each of the third and fourth slice: (i) has identical properties between the first and second operators and (ii) comprising partitioned network capabilities that are specific to offering a vehicular service, and (iii) comprising either physically separate network functions from the first and second default slices, or network functions whose resources are shared with same or different functions of said first and second default slices;

the method comprising:

(a) the vehicle sending a registration request message and attaching, based on the registration request message, to a first access and mobility function (AMF) associated with the first default slice of the first operator, wherein the registration request message comprises an indicator denoting a desire to attach to the fourth slice;

(b) the first AMF verifying identity of the vehicle from the registration request message;

(c) upon successful verification in (b), the first AMF redirecting the registration request message to a second AMF of second default slice associated with the second operator;

(d) the second AMF querying the identity of the vehicle in a vehicle ID registrar database and authorizing the vehicle; and (e) the second AMF then querying a policy control function to obtain vehicle policy indications and instructing the vehicle to use network functions of the fourth slice in accordance with the vehicle policy indications.

2. The method of claim 1, wherein the network functions comprise specialized virtual network transportation functions containing traffic related data and logic, wherein the specialized virtual network transportation functions being distributed within the core network, but used only by vehicles.

3. The method of claim 1, wherein the vehicle first connects to a distributed radio access network (RAN) with multi-radio access technology distributed to edges of highways, said RAN further including 5G, 4G, 3G and WiFi radio access capabilities.

4. The method of claim 3, wherein each distributed RAN with multi-radio access technology further including co-located and dedicated slice network functions.

5. The method of claim 3, wherein multiple distributed RANs with multi-Radio Access Technology are served by a separate system comprised of dedicated slice network functions.

6. The method of claim 3, wherein multiple distributed RANs with multi-Radio Access Technology further connect to the core network wherein the slice network functions are an overlay.

7. The method of claim 1, wherein the vehicle ID registrar is a database that comprises data pertaining to each vehicle, the data comprising a vehicle's permanent ID picked from the following: IMEI, PEI, and MAC address, wherein such a permanent ID is assigned to each vehicle at the time of manufacturing and stored in the vehicle.

8. The method of claim 1, wherein the vehicle ID registrar is a database implemented as any of the following: a 5G-EIR, a 5G-UDR, or a separate network function.

9. The method of claim 1, wherein the vehicle ID registrar is a database that further comprises non-permanent data picked from any of the following: an IP address, a plate number, and owner's information.

10. The method of claim 1, wherein the steps of the method are implemented in computer program comprising instructions, which, when executed on at least one processor, cause the at least one processor to carry out methods described above, as performed by all said network functions.

11. The method of claim 1, wherein method is implemented in computer program code stored in computer-readable storage medium having a computer program stored within comprising instructions which, when executed on at least one processor, cause the at least one processor to carry out the method.

12. An article of manufacture comprising non-transitory computer storage medium storing computer readable program code which, when executed by a processor implements a method implemented in a mobile network communications infrastructure enabling communications for a vehicle furnished with radio network access capabilities and able to connect to multiple operators, the mobile network communications infrastructure comprised of at least a first and second operators, the first operator having a first default slice associated with its core network and the second operator having a second default slice associated with its core network, the first and second operators also having a third and fourth slice, respectively, wherein each of the third and fourth slice: (i) has identical properties between the first and second operators and (ii) comprising partitioned network capabilities that are specific to offering a vehicular service, and (iii) comprising either physically separate network functions from the first and second default slices, or network functions whose resources are shared with same or different functions of said first and second default slices;

the computer storage medium comprising:
(a) computer readable program code in the vehicle sending a registration request message and attaching, based on the registration request message, to a first access and mobility function (AMF) associated with the first default slice of the first operator, wherein the registration request message comprises an indicator denoting a desire to attach to the fourth slice;
(b) computer readable program code in the first AMF verifying identity of the vehicle from the registration request message;
(c) upon successful verification in (b), computer readable program code in the first AMF redirecting the registration request message to a second AMF associated with the second slice of the second operator;
(d) computer readable program code in the second AMF querying the identity of the vehicle in a vehicle ID registrar database and authorizing the vehicle; and
(e) computer readable program code in the second AMF then querying a policy control function to obtain vehicle policy indications and instructing the vehicle to use network functions of the fourth slice in accordance with the vehicle policy indications.

13. The article of manufacture of claim 12, wherein the network functions comprises specialized virtual network transportation functions containing traffic related data and logic, wherein the specialized virtual network transportation functions being distributed within the core network, but used only by vehicles.

14. The article of manufacture of claim 12, wherein the vehicle first connects to a distributed radio access network (RAN) with multi-radio access technology distributed to edges of highways, said RAN further including 5G, 4G, 3G and WiFi radio access capabilities.

15. The article of manufacture of claim 14, wherein each distributed RAN with multi-radio access technology further including co-located and dedicated slice network functions.

16. The article of manufacture of claim 14, wherein multiple distributed RANs with multi-Radio Access Technology are served by a separate system comprised of dedicated slice network functions.

17. The article of manufacture of claim 14, wherein multiple distributed RANs with multi-Radio Access Technology further connect to the core network wherein the slice network functions are an overlay.

18. The article of manufacture of claim 14, wherein the vehicle ID registrar is a database that comprises data pertaining to each vehicle, the data comprising a vehicle's permanent ID picked from the following: IMEI, PEI, and MAC address, wherein such a permanent ID is assigned to each vehicle at the time of manufacturing and stored in the vehicle.

19. A method implemented in a mobile network communications infrastructure enabling communications for a vehicle furnished with radio access capabilities and able to connect to multiple operators, the mobile network communications infrastructure of each operator among the multiple operators being comprised of a first default slice associated with its core network and a set of slices, wherein: (i) each slice in the set of slices using a different set of virtual data plane network functions and thereby each with different partitioned network capabilities that are specific to offering an aspect of a vehicular service, (ii) the set of slices being either comprised of a physically separate network functions from the first slice, or network functions whose resources are shared with same or different functions of the first slice, the method comprising:
(a) the vehicle sending a registration request message and attaching, based on the registration request message, to a first access and mobility function (AMF) associated with the first default slice, wherein the registration request message comprises an indicator denoting a desire to use services of one or more slices within the set of slices;
(b) the first AMF communicating with a network slice selection function (NSSF), and identifying a second AMF associated with a second slice within the set of slices that is closest to the vehicle to trigger a redirection action of the registration request message for each specific service type in the indicator;
(c) the first AMF redirecting the registration request message to the second AMF;
(d) the second AMF querying the identity of the vehicle in a vehicle ID registrar database and authorizing the vehicle in the second slice identified in (b); and
(e) the second AMF then querying a policy control function to obtain vehicle policy indications and instructing the vehicle to use network functions of the second slice identified in (b) in accordance with the vehicle policy indications.

* * * * *